Nov. 4, 1941.   H. W. CARDWELL   2,261,870
COUNTERWEIGHT FOR HOISTING MACHINERY
Filed Feb. 11, 1941   2 Sheets—Sheet 2

Inventor
Harland W. Cardwell
By Baron & Thomas
Attorneys

Patented Nov. 4, 1941

2,261,870

UNITED STATES PATENT OFFICE 2,261,870

COUNTERWEIGHT FOR HOISTING MACHINERY

Harland W. Cardwell, Wichita, Kans.

Application February 11, 1941, Serial No. 378,452

5 Claims. (Cl. 212—8)

This invention relates to a counterweight for hoisting machinery and more particularly to an improved counterweight structure by which the center of gravity of the counterweight may be moved under control of the operator to a position more remote from the load to be hoisted or transported.

The invention is particularly applicable to so-called "sidebooms," which are adapters for converting tractors of the endless track type into mobile hoisting equipment by providing the tractor with a hoisting boom on one side thereof and suitable pulleys, cables and drums driven from a power takeoff from the tractor motor. Such equipment has come into general use for the rapid transporting and positioning of heavy objects in construction work. As an example, a plurality of tractors equipped with sidebooms are extremely useful in picking up, transporting and positioning in a trench, long sections of heavy pipe in the rapid construction of pipe lines.

Since the point of application of the hoisting stress is usually spaced some distance from the side of the tractor it becomes desirable to provide the tractor with a counterweight upon its opposite side to prevent tipping of the tractor during hoisting. Stationary counterweights have been thus employed. The employment of a stationary counterweight requires either that the counterweight be extremely heavy or that it be positioned outwardly from the side of the tractor a distance which undesirably increases the width of the equipment. In either case the tractor is subjected to a heavy unbalanced load between hoisting operations or while in transport over uneven topography or rough terrain. When such conditions are encountered the counterweight may be moved out to immediately increase the load capacity.

In accordance with the present invention a counterweight, which is adequate for light loads, is provided on the opposite side of the tractor from the boom and provision is made for shifting the center of gravity of the counterweight away from the center line of the tractor so as to increase its counterbalancing effect when heavy loads are being handled or transported. When the counterweight is withdrawn to its normal position and the boom is raised to its uppermost position the width of the tractor and sideboom equipment is such that the tractor can be driven along relatively narrow roads and through relatively narrow passageways. Also the load on the tractor can be maintained more evenly balanced under any conditions of hoisting or transporting a load as well as between hoisting operations.

An object of the present invention is, therefore, to provide improved hoisting or load carrying equipment in which the counterweight may be moved so as to increase or decrease its counterbalancing effect.

Another object of the invention is to provide improved sideboom equipment capable of being attached to a tractor for handling heavy loads without unduly increasing the weight of the tractor or the width thereof.

A further object of the invention is to provide an improved counterweight structure for hoisting and transporting equipment in which the center of gravity of a counterweight may, under control of the operator of the equipment, be moved with respect to the application of the hoisting stress so as to control its counterbalance effect without changing the weight of the equipment.

A still further object of the invention is to provide an improved counterweight structure for sideboom adapters for tractors in which the center of gravity of a counterweight may be moved laterally with respect to the tractor.

Other objects and advantages of the invention will appear in a preferred embodiment of the invention of which:

Figure 2:
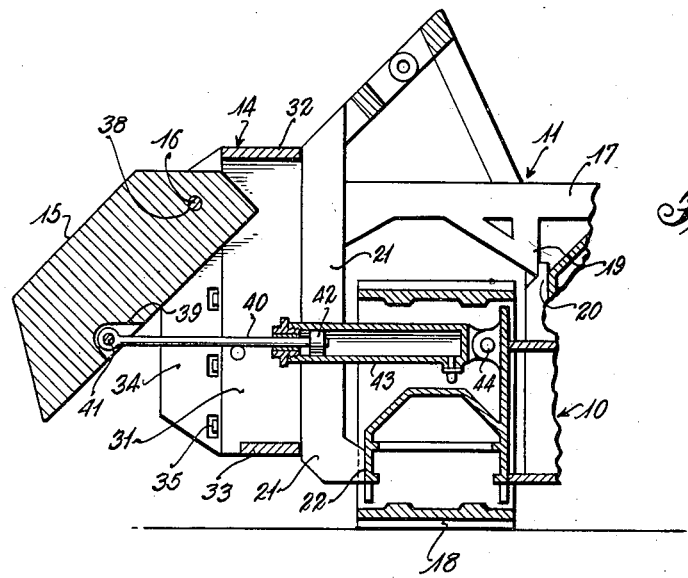
Fig. 2 is a fragmentary sectional view with certain of the mechanism of the tractor omitted showing the counterweight in extended position.

Referring to the drawings, 10 indicates in general the frame of the tractor; 11 indicates in general the auxiliary frame and the sideboom equipment; 12 indicates a boom pivotally connected at 13 to the auxiliary frame 11; 14 indicates a counterweight supporting structure secured to the auxiliary frame 11; and 15 indicates the counterweight pivoted at 16 to the counterweight supporting structure. The auxiliary frame 11 may include an upper frame member 17 extending transversely across the central portion of the tractor above the tracks 18 of the tractor. The upper frame member may have oppositely disposed portions 19 bearing against the tractor frame at 20 as shown most clearly in Fig. 2 and downwardly extending side frame members 21 integral with or rigidly secured to the top frame member 17. Downwardly extending side frame members bear against and are rigidly secured at 22 to the portion of the frame 10 of the tractor which extends laterally inside the tracks 18 of the tractor as shown in Fig. 2.

The boom 12 may be pivoted to one of the sideboom members 21 of the auxiliary frame adjacent the lower portion thereof. Suitable means such as a block and tackle 24 may be provided for raising and lowering the boom and a block and tackle 25 for handling a load which may be attached to the hook 26. The block and tackle 24 may include a stationary pulley 27 journalled in an extension 28 of the auxiliary frame 11 and a drum 29 driven from the engine of the tractor through suitable power take off and control equipment (not shown) may be provided for operating the block and tackle 24. Similarly, a drum 30 carried by the auxiliary frame may be similarly driven for operating the block and tackle 25.

Figure 3:
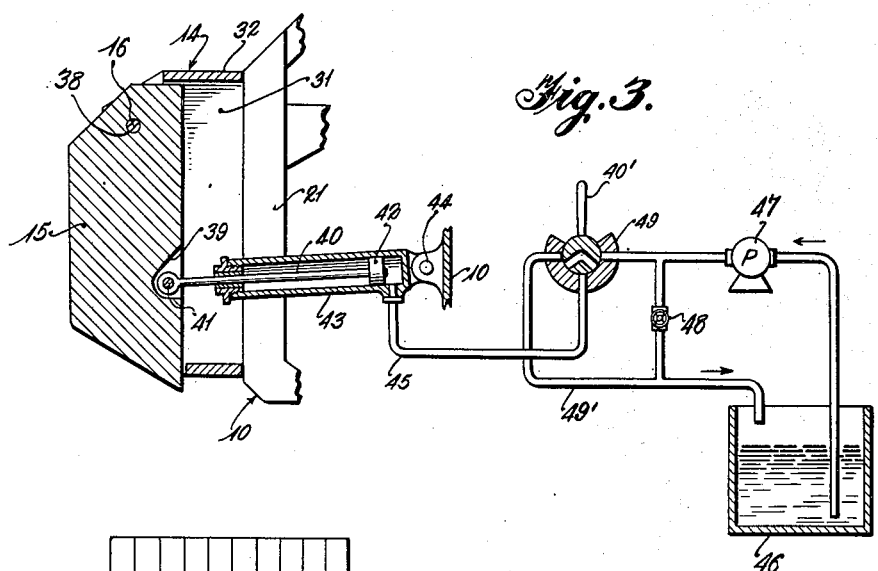
Fig. 3 is a fragmentary sectional view of the counterweight in retracted position; and also showing diagrammatically a suitable control system.
Figure 4:
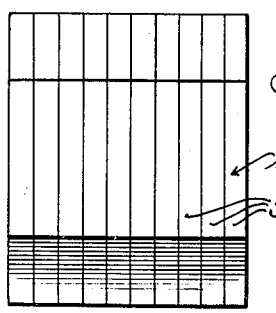
Fig. 4 is a side elevation of the counterweight showing the laminated construction thereof.

The counterweight supporting structure 14 may be secured to the auxiliary frame 21 in any suitable manner, for example, by welding, and may include side members 31 and upper member 32 and lower member 33 forming a hollow structure into which the counterweight may partially extend. The counterweight supporting structure may also include side members 34 forming continuations of the side members 31 and secured thereto in any suitable manner, for example, by studs 35. As shown in Fig. 4 the counterweight is preferably made up of a plurality of steel or other heavy metal plates or laminations 36. A shaft or pivot 16 extends through an aperture in the upper portions of the plates 36 and through apertures 38 in the side members 34 as shown in Figs. 2 and 3. One of the centrally disposed plates 36 may be cut out at 39 to provide room for connecting a plunger rod 40 to a shaft or pivot 41 extending through apertures in the plates 36 to connect the counterweight assembly to said plunger rod 40. The plunger rod 40 may be connected to a piston or plunger 42 positioned in a cylinder 43 pivotally connected to the frame 10 of the tractor at 44. It will be noted from Fig. 2 that the cylinder extends inwardly within the upper portion of the track 18 of the tractor. A plurality of rollers (not shown) are ordinarily carried by the frame of the tractor within the upper portion of the track 18 in order to support the same and the cylinder 43 may be conveniently placed between two of these rollers. The cylinder 43 may be connected to a suitable pressure control system by a conduit 45. Such a system is shown diagrammatically in Fig. 3 and may include a source of fluid such as a reservoir 46, a pump 47 provided with a bypass having a pressure regulating valve 48 therein and a control valve 49 for connecting the conduit 45 either to the pump 47 or an exhaust conduit 49 for returning exhaust fluid to the source of supply 46. The control valve 49 may have an operating position, a release position, and a neutral position, the valve being shown in its neutral position. It is apparent that rotation of the valve to the left by the handle 40 will connect the cylinder 43 to the pump 47 to move the piston 42 to the left so as to swing the counterweight into the position shown in Fig. 2. Rotation of the valve 49 to the right will connect the cylinder 43 to the exhaust conduit 49 allowing the piston 42 to be returned to the right by the counterweight 15. The counterweight may thus be caused to move to either extreme position or any intermediate position. Leaving the valve in neutral position will cause the counterweight to be maintained in any selected position.

Figure 1:
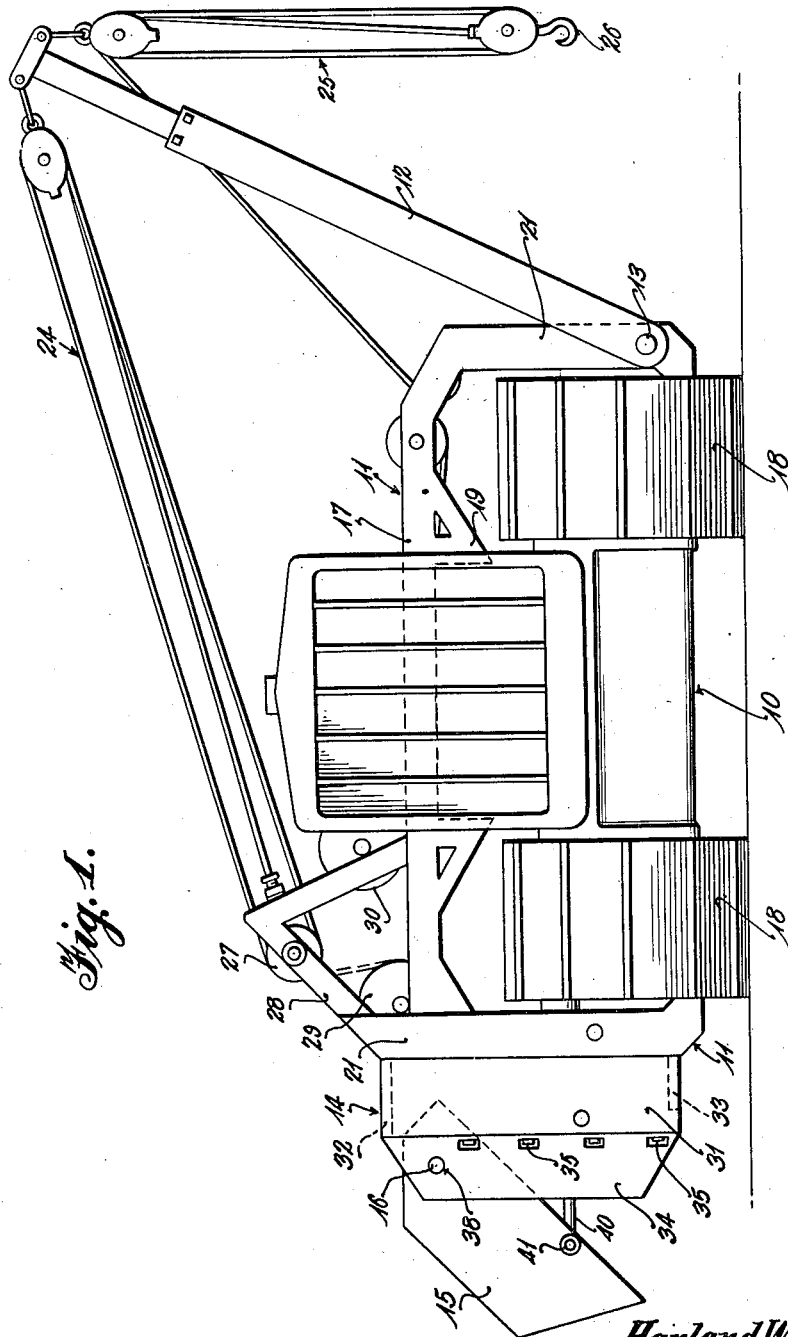
Fig. 1 is a front elevation of the structure of the present invention applied to a tractor of the endless track type.

For relatively light loads when the boom 12 is being operated in nearly vertical position the counterweight may be retracted into the position shown in Fig. 3. This is also the normal position of the counterweight when the sideboom equipment is idle. When heavy weights are being handled which tend to cause the tractor to tip, the counterweight may be extended into the position in Fig. 2, thus increasing its counterbalancing effect. The counterweight may also be moved to any intermediate position to provide the desired counterbalance for intermediate loads. It is apparent from Fig. 1 that retraction of the counterweight and raising the boom 12 to its vertical position will provide a structure which does not greatly exceed the normal width of a tractor so that the equipment may be handled in relatively narrow quarters. The counterweight structure disclosed herein has particular utility in sideboom adapters for tractors but it is apparent that similar counterweight structures will have utility in other types of hoisting equipment.

While I have disclosed the preferred embodiment of my invention, it is understood that the details thereof may be varied within the scope of the following claims.

I claim:

1. In combination, a hoisting device, a counterweight positioned to counterbalance the hoisting stress on said device, said counterweight having a pivot at the upper portion thereof and means for moving the said counterweight outwardly independent of said stress, said means comprising a thrust element located at a point below said pivot.

2. In combination, a hoisting device, a counterweight positioned to counterbalance the hoisting stress on said device, said counterweight having a pivot at the upper portion thereof and means for moving the said counterweight outwardly independent of said stress, said means comprising an hydraulic piston engaged with the counterweight at a point below said pivot.

3. In a hoisting device adapted to be carried by a tractor of the type provided with a pair of endless tracks, a frame for said hoisting device supported by said tractor, a boom connected at one side of said tractor to said frame, a counterweight supported by said frame on the other side of said tractor, said counterweight being positioned to counterbalance the hoisting stress on said device and having a pivot at the upper portion thereof, and means for swinging said counterweight outwardly comprising a thrust element located at a point on said counterweight below said pivot.

4. In a hoisting device adapted to be carried by a tractor of the type provided with a pair of endless tracks, a frame for said hoisting device supported by said tractor, a boom connected at one side of said tractor to said frame, a counterweight supported by said frame on the other side of said tractor, said counterweight being positioned to counterbalance the hoisting stress on said device and having a pivot at the upper portion thereof, and means for swinging said counterweight outwardly comprising an hydraulic motor having a cylinder member and a piston member, one of said members being engaged with the counterweight at a point below the pivot.

5. In combination, a hoisting device, a counterweight to balance the hoisting stress on said device, said counterweight having a pivot at the upper portion thereof and means for moving outwardly and maintaining said counterweight in a selected position, said means comprising an hydraulic motor having a cylinder member and a piston member, said piston member being engaged with the counterweight at a point below said pivot.

HARLAND W. CARDWELL.